United States Patent
Landes et al.

(10) Patent No.: US 9,702,287 B2
(45) Date of Patent: Jul. 11, 2017

(54) TANK INSERT MODULE, LIQUID TANK

(75) Inventors: Ewgenij Landes, Remseck (DE);
Steffen Schott, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 251 days.

(21) Appl. No.: 13/994,472

(22) PCT Filed: Dec. 9, 2011

(86) PCT No.: PCT/EP2011/072336
§ 371 (c)(1),
(2), (4) Date: Jun. 14, 2013

(87) PCT Pub. No.: WO2012/080129
PCT Pub. Date: Jun. 21, 2012

(65) Prior Publication Data
US 2013/0263941 A1    Oct. 10, 2013

(30) Foreign Application Priority Data
Dec. 14, 2010   (DE) .................. 10 2010 062 982

(51) Int. Cl.
*F01N 3/20* (2006.01)
*B01D 35/00* (2006.01)
(Continued)

(52) U.S. Cl.
CPC .......... *F01N 3/20* (2013.01); *B01D 35/005* (2013.01); *F01N 3/2066* (2013.01);
(Continued)

(58) Field of Classification Search
USPC ................. 137/341; 222/146.1, 146.2, 146.5
See application file for complete search history.

(56) References Cited

U.S. PATENT DOCUMENTS 3,055,055 A * 9/1962 Cook et al. ............ 425/447
3,239,649 A * 3/1966 Reeve ................. H05B 3/78
222/146.5
(Continued)

FOREIGN PATENT DOCUMENTS

DE    102005036430    2/2007
DE    102006027487    3/2007
(Continued)

OTHER PUBLICATIONS

International Search Report for Application No. PCT/EP2011/072336 dated Mar. 8, 2012 (2 pages).

*Primary Examiner* — Kevin Murphy
*Assistant Examiner* — Johnathan Waddy
(74) *Attorney, Agent, or Firm* — Michael Best & Friedrich LLP (57) ABSTRACT

The invention relates to a tank insert module (1) for extracting liquid from a vehicle tank, comprising a basic body (2) composed of a plastic, on which basic body are arranged a liquid extraction device (23), which comprises an extraction opening (4) which can be assigned to the tank interior space, and at least one electric heating element (7), wherein the electric heating element (7) comprises a heating body (8) with an extrusion-coated plastic encapsulation (9). It is provided here that the plastic encapsulation (9) has a plastic which can be welded to the basic body, in particular high-density polyethylene, and/or the same plastic as the basic body (2), and also at least one filler material with high thermal conductivity, and is welded to the basic body (2) at at least one contact point (17). The invention also relates to a liquid tank for vehicles.

12 Claims, 8 Drawing Sheets

(51) Int. Cl.
*B65D 83/00* (2006.01)
*B60K 15/03* (2006.01)

(52) U.S. Cl.
CPC .... *B60K 2015/03427* (2013.01); *B65D 83/00* (2013.01); *F01N 2530/20* (2013.01); *F01N 2610/02* (2013.01); *F01N 2610/10* (2013.01); *F01N 2610/1406* (2013.01); *Y02T 10/24* (2013.01); *Y10T 137/6416* (2015.04); *Y10T 137/6881* (2015.04); *Y10T 428/239* (2015.01)

(56) References Cited

U.S. PATENT DOCUMENTS

| | | | | |
|---|---|---|---|---|
| 3,580,267 A | * | 5/1971 | Baker | 137/203 |
| 3,943,328 A | * | 3/1976 | Cunningham | 392/503 |
| 4,195,114 A | * | 3/1980 | Crosby | B29B 9/12 |
| | | | | 428/373 |
| 4,493,972 A | * | 1/1985 | Steinel et al. | 219/230 |
| 4,544,385 A | * | 10/1985 | Tanaka | B01D 53/261 |
| | | | | 137/341 |
| 4,684,786 A | * | 8/1987 | Mann | F02M 31/125 |
| | | | | 123/549 |
| 5,190,025 A | * | 3/1993 | Chen | 126/19.5 |
| 5,269,217 A | * | 12/1993 | Goad | 99/483 |
| 5,930,459 A | * | 7/1999 | Eckman | H05B 3/04 |
| | | | | 219/523 |
| 6,063,350 A | * | 5/2000 | Tarabulski | B01D 53/90 |
| | | | | 423/212 |
| 6,312,639 B1 | * | 11/2001 | Ertle | C08J 3/201 |
| | | | | 264/176.1 |
| 6,674,050 B2 | * | 1/2004 | Hansen | A61F 7/0241 |
| | | | | 219/385 |
| 6,936,161 B2 | * | 8/2005 | Wright | B01D 29/21 |
| | | | | 210/109 |
| 9,127,583 B2 | * | 9/2015 | Hodgson | F01N 3/2066 |
| 2003/0079787 A1 | * | 5/2003 | Heise | 138/33 |
| 2008/0256937 A1 | * | 10/2008 | Suzuki | F01N 3/105 |
| | | | | 60/300 |
| 2009/0065508 A1 | * | 3/2009 | Haeberer | F01N 3/2066 |
| | | | | 220/562 |
| 2009/0078692 A1 | * | 3/2009 | Starck | F01N 3/2066 |
| | | | | 219/260 |
| 2009/0100824 A1 | * | 4/2009 | Starck | B01D 53/9431 |
| | | | | 60/286 |
| 2010/0107615 A1 | * | 5/2010 | Chmielewski | F01N 3/2066 |
| | | | | 60/303 |
| 2010/0154907 A1 | * | 6/2010 | Lecea | F01N 3/2066 |
| | | | | 137/565.29 |
| 2010/0175369 A1 | * | 7/2010 | Op De Beeck | B01D 35/027 |
| | | | | 60/274 |
| 2010/0303453 A1 | * | 12/2010 | Haeberer | F01N 3/2066 |
| | | | | 392/449 |
| 2013/0048120 A1 | * | 2/2013 | Haeberer | F01N 3/2066 |
| | | | | 137/565.01 |
| 2013/0263938 A1 | * | 10/2013 | Harr | F01N 3/2066 |
| | | | | 137/334 |

FOREIGN PATENT DOCUMENTS

| | | | |
|---|---|---|---|
| DE | 102009012983 | 9/2010 | |
| DE | 102010028863 A1 | * 11/2011 | ........... F01N 3/2066 |
| EP | 2161421 | 3/2010 | |

* cited by examiner

TANK INSERT MODULE, LIQUID TANK

BACKGROUND OF THE INVENTION

The invention relates to a tank insert module for removing liquid from a vehicle tank, comprising a main body made of a plastic material, on which a liquid removal device, which comprises at least one removal opening that can be assigned to the tank interior, and at least one electrical heating element are arranged, wherein the electrical heating element comprises a heating body with an extrusion-coated plastic encapsulation.

The invention also relates to a liquid tank for vehicles, in particular for an exhaust gas aftertreatment system of a motor vehicle, with at least one wall, which has an opening, in which a tank insert module for removing liquid from the tank is arranged so as to close the opening.

Tank insert modules and liquid tanks of the type mentioned in the introduction are known to a person skilled in the art from the prior art. For example, the German Offenlegungsschrift DE 10 2006 027 487 A1 discloses a vehicle tank for aqueous urea solutions, said vehicle tank having an opening, in which a functional unit corresponding to a tank insert module is arranged. The tank insert module comprises a main body made of plastic, which is held on the tank. A pump for removing liquid from the tank is provided on the main body, wherein the pump is assigned a channel with a removal opening. Furthermore, the tank insert module has an electrical heating element so as to enable frozen liquid to thaw at low temperatures so that liquid removable from the tank is available or is made available even at low temperatures. The heating element comprises a heating body manufactured from aluminum, which is extrusion-coated with plastic and therefore has a plastic encapsulation. The plastic is primarily used to protect the heating body against direct contact with the liquid located in the tank. Both the connection of the heating element to the electrics/electronics of the vehicle for example and a sufficient coefficient of thermal conduction for the plastic encapsulation are significant for a system that ensures functionality in a long-lasting manner.

SUMMARY OF THE INVENTION

The tank insert module according to the invention has the advantage that the heating element can be connected in a particularly simple manner to the main body and simultaneously operates in an energy-efficient manner. The tank insert module according to the invention is characterized in that the plastic encapsulation comprises the same plastic as the main body as well as at least one filler material with high thermal conductivity and is welded to the main body at least at one contact point. In accordance with the invention, the plastic encapsulation of the electrical heating element thus consists of plastic and at least one filler material, that is to say with at least one substance having a high thermal conductivity incorporated or introduced into the plastic. Here, the plastic selected is a plastic also used to produce the main body. Due to the selection of the same plastic materials for the plastic encapsulation and the main body, the two elements can be integrally bonded to one another quickly and reliably. The plastic used or provided is preferably a high-density polyethylene, that is to say what is known as an HDPE plastic. A good level of resistance, in particular with respect to conventional liquids that are used for exhaust gas aftertreatment, is ensured as a result of the use of HDPE plastic. Due to the selection of the same plastics, the elements can be optimally welded to one another, whereby seals in the contact region can be omitted and the associated risk of a leakage of liquid as a result of deformation, swelling, deformation caused by temperature change, pressure change, vibrations and/or decomposition caused by incorrect refueling is thus minimized. Alternatively or in addition, it is also conceivable to weld the tank insert module and/or the heating element with the advantageous plastic encapsulation directly to the wall of a tank, provided the tank is likewise manufactured from the HDPE plastic. Due to the use of HDPE, the thermal output of the heating element is indeed reduced, but is compensated for or increased by the filler material having high thermal conductivity so that a thermal conductivity of the extrusion-coated plastic encapsulation is provided in spite of the use of the HDPE plastic and is sufficient to efficiently heat the liquid, which may be frozen, in the tank. The dimensional stability under heat of the plastic encapsulation is also increased as a result and therefore a greater operating temperature is also enabled. In spite of the thus altogether different thermal conductivity properties in relation to the main body, the plastic encapsulation is reliably connected or connectable to the main body by means of the weld point. Alternatively, different plastics can also be used if they can be welded to one another and the weld point thus produced meets the necessary strength and tightness requirements (for example heating body made of filled PP (polypropylene) welded to tank insert module made of HDPE).

The filler material preferably accounts for a proportion of 20% to 65%, in particular 40%, of the weight of the plastic encapsulation. The thermal conductivity of plastic has to increase in this case by at least 10%. Here, the thermal conductivity should preferably be greater than that of the medium to be thawed or heated. In the case of urea, a thermal conductivity of the plastic encapsulation above 0.5 W/mK is advantageous, in particular/better still 1 W/mK and more. Due to the admixing of the filler material, the coefficient of thermal expansion of the plastic encapsulation is also lowered compared to unfilled HDPE plastic, and therefore approximates the coefficients of thermal expansion of the heating body consisting preferably of aluminum. If the heating element is operated, that is to say heated, the heating body in particular prevents the plastic encapsulation from detaching due to the adapted coefficients of thermal expansion and, upon cooling, the stresses produced by shrink fitting are reduced. The at least one filler material is preferably electrically non-conductive and preferably has an electrical resistivity above 500,000 Ω·m.

At least one mineral filler material and/or glass fibers is/are particularly preferably provided or introduced into the plastic as electrically non-conductive filler material. The amount of filler material is preferably such that a minimal elongation at failure of 2.5% is achieved so as to not exceed permissible elongations/stresses as a result of temperature-induced deformations between the heating body and the plastic encapsulation.

As already mentioned, the heating body is preferably formed at least substantially from aluminum and also has at least one PTC (positive temperature coefficient) element for heating. PTC heating elements do not require any additional devices for temperature control or overtemperature protection. They are formed so as to be self-regulating and can thus be used in a simple manner. In addition, they are of small design, as a result of which they can preferably be integrated into the heating element. To this end, the plastic encapsulation and/or the heating body preferably has a corresponding receiving pocket for receiving the PTC heating element, preferably with an interlocking connection, so that the PTC heating element is integrated completely into the heating element or is fully encased by the plastic encapsulation.

In accordance with an advantageous development of the invention, at least one filter element arranged upstream of the removal opening for filtering the liquid before removal thereof is arranged in the main body. The filter element is preferably assigned to the region, or a region, of the electrical heating element so that even liquid located at the filter element can be thawed and the filter effect can be utilized. The filter element or at least one filter support body of the filter element is particularly preferably manufactured from the same plastic as the main body of the tank insert module or from the same material as the plastic encapsulation so that the filter element or the filter support body thereof can be fixed to the tank insert module by welding. In addition, due to the integral bond with the plastic encapsulation, the heat of the heating element can be conducted into the filter or into the filter support element in order to accelerate the thawing process.

The heating body preferably extends substantially in one plane in a star-like manner and in particular has at least one cross-sectional tapered portion. The at least one PTC heating element is particularly preferably located centrally in the heating element or on the heating body so that the heat emanating from the PTC heating element is transported or conducted via the star-like structure of the heating body into regions located radially further outwardly. By providing the at least one cross-sectional tapered portion on the heating body, the heating energy can be distributed gradually over the heating body. As a result of correspondingly provided cross-sectional tapered portions or cross-sectional constrictions, the heating energy available can thus be conducted selectively so that the region of the heating element assigned to the removal opening is preferably heated first and the liquid located there is thawed, and the remaining regions of the heating element are then heated. With the same heating energy available, the removal region at the removal opening can thus be thawed in a predefined period of time and, at the same time, a large amount of liquid can be thawed by the subsequent energy propagation. In addition, the distribution of heating energy can be influenced as required by a different thickness of the extrusion-coated plastic encapsulation.

Furthermore, at least one of the welded contact points between the main body and the plastic encapsulation of the heating element forms or has an electrical interface between the heating element and a connection line leading through the main body. In the region of the contact point, the electrical lines leading to the PTC heating elements are particularly preferably guided out from the plastic encapsulation and for example end directly in an integrated male blade. The main body, at a corresponding point, has a corresponding plug board, which is connected to the connection lines leading through the main body. By inserting the male blade into the male multipoint connector, the electrical contact between the at least one PTC heating element and an electronics unit arranged in particular outside the tank is thus produced. By welding the contact point, the electrical interface is provided simultaneously with reliable and robust protection with respect to the liquid located in the tank. The electrical interface is particularly preferably formed by means of a method for producing a force-locked connection, such as by known fork contacting, ram contacting, clamp contacting or the like. Alternatively, the electrical interface is preferably formed in such a way that the heat supplied during the welding process is sufficient to produce an integrally bonded connection in the electrical interface. To this end, the electrical interface preferably has a corresponding solder medium.

Furthermore, the connection line is preferably assigned to a removal channel of the main body discharging into the removal opening. The connection line is particularly preferably arranged parallel to the removal channel in such a way that the heat emanating from the connection line heats or thaws the removal channel and the liquid located therein. As soon as the heating element is activated the removal channel is thus heated and liquid located therein is thawed. The removal channel is preferably formed by the main body.

In order to keep the possible loads in the event of pressure build-up as low as possible by a liquid cavity, which is produced by encapsulation by frozen liquid, at least one large radius, an inclined surface, or chamfer is preferably provided at an edge of the plastic encapsulation and/or of the heating body. At least some of the effective forces are compensated for by the radius, the inclined surface, or chamfer. The large radius or the incline surface or chamfer is particularly preferably attached or provided at an edge that is located at the lower part of the heater, that is to say on the side of the heating element facing the base of the tank.

The liquid tank according to the invention is characterized by the formation of the tank insert module, as has been described above. Here, the advantages already described above are provided. The wall of the liquid tank is particularly preferably manufactured from the same material as the main body of the tank insert module and the main body is particularly preferably welded to the wall of the tank. The main body is preferably formed in a flange-like manner in order to close the opening in the wall.

BRIEF DESCRIPTION OF THE DRAWINGS

The invention will be explained in greater detail hereinafter on the basis of the drawing, in which.

DETAILED DESCRIPTION

Figure 1:
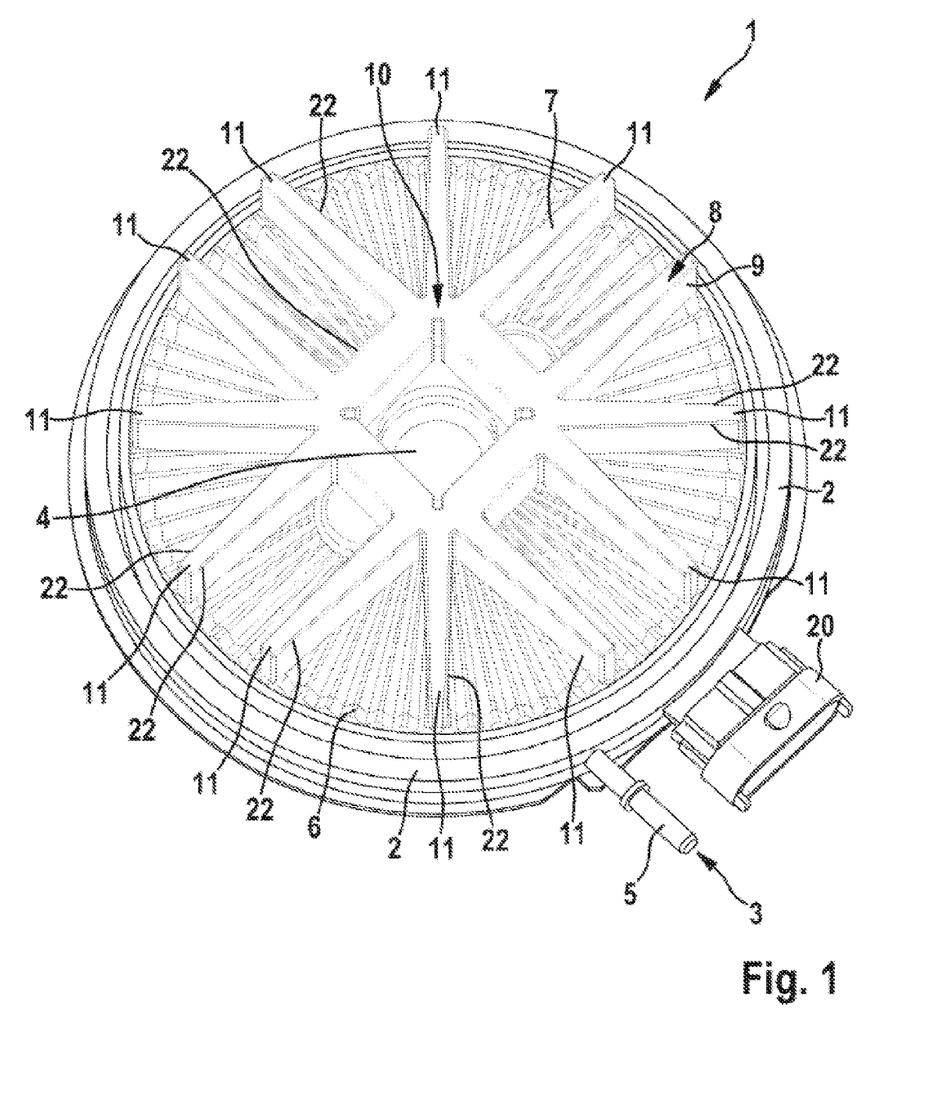
FIG. 1 shows a perspective illustration of a tank insert module.

FIG. 1 shows a perspective illustration of a tank insert module 1, which can be arranged in an opening of a tank, preferably closing the opening. The insert module has a main body 2, which is manufactured from an HDPE plastic and has a substantially circular area. A removal channel 3, which discharges into a removal opening 4 formed in the main body, leads through the main body 2. Here, the removal opening 4 is arranged on the side of the main body 2 or of the tank insert module 1 facing the tank interior. The removal channel 3 extends from the removal opening 4 as far as a radially protruding connection 5, which for example can be connected to the input of a suction device.

The removal channel 3 is preferably formed in one piece with the main body 2 so that the removal channel 3 is directly integrated into the main body 2. The removal opening 4 is assigned a filter element 6, which is formed annularly and is aligned coaxially with the main body 2. The filter element 6 is used to filter the liquid located in the tank before it is removed from the tank through the removal channel 3. A heating element 7 is arranged above the filter element 6 and extends in a star-shaped manner substantially over the entire main body 2 or over the filter element 6. The heating element 7 comprises a heating body 8, which is surrounded, in particular extrusion-coated, by a plastic encapsulation 9.

Figure 2A:
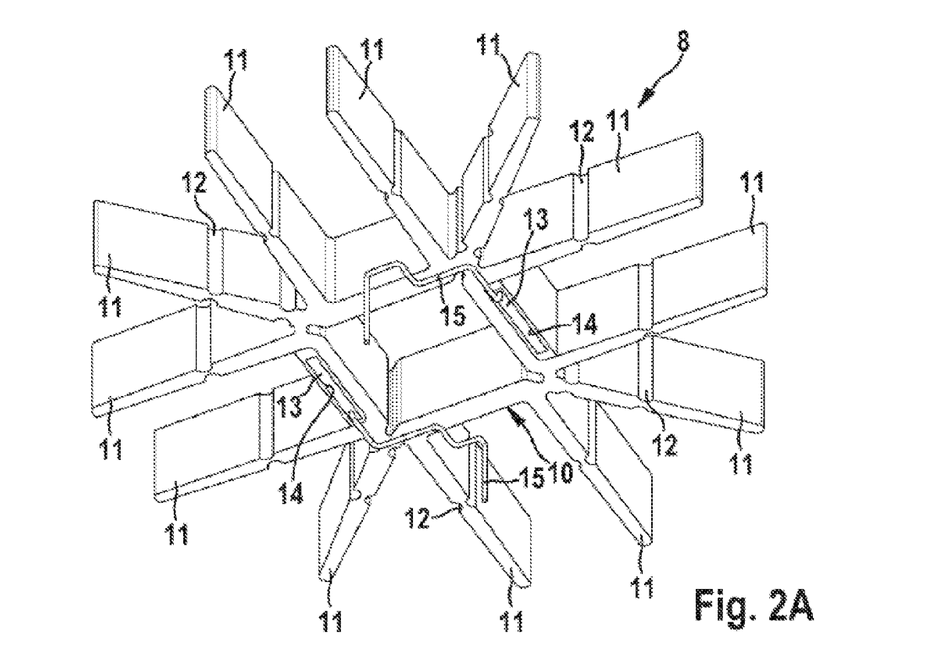
FIGS. 2A and 2B show different views of the heating body of a heating element.
Figure 2B:
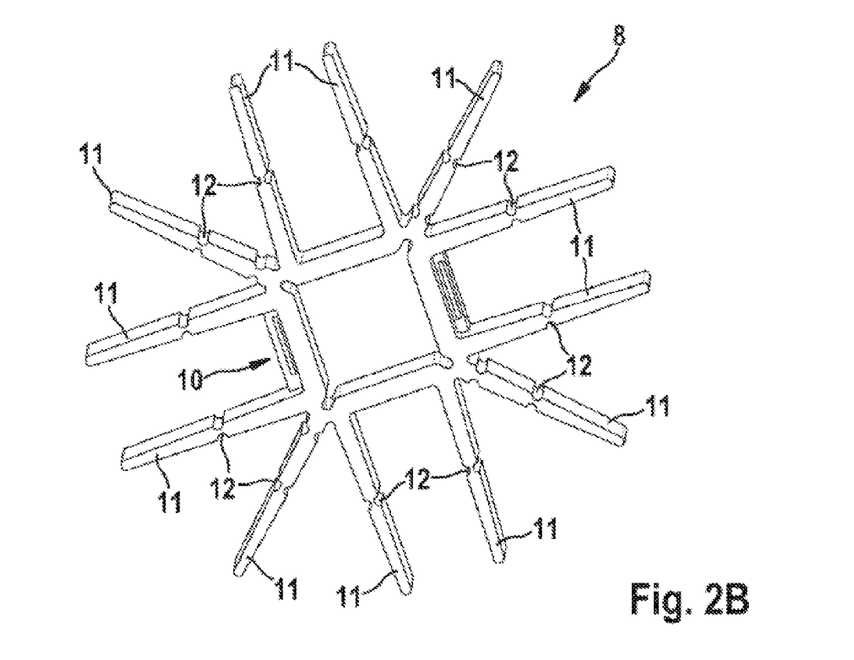

In this regard, FIGS. 2A and 2B show different perspective illustrations of the heating body 8. The heating body 8 has a rib-like structure with a square core 10, from each of the four corners of which three arms 11 extend, which are oriented at an angle of 45° to one another. The core 10 can alternatively also be open on one or more sides and the arms 11 can alternatively also be arranged parallel and/or at 90° angles to one another. Each of the arms 11 has an approximately centrally arranged cross-sectional tapered portion 12, which, as viewed in cross section, each extend over the height of the rectangular arm 11. For reasons of clarity, only some of the cross-sectional tapered portions are provided with a reference sign here. The function of the cross-sectional tapered portions 12 will be discussed in greater detail further below. Two PTC heating elements 13 are also arranged on the heating body 8. To this end, the heating body 8, which is preferably manufactured from aluminum, has two receiving pockets 14 in the core 10, a PTC heating element 13 being inserted with an interlocking fit, at least over regions, into each receiving pocket. As illustrated in FIG. 2A, the PTC heating elements are preferably arranged oppositely on the core 10. A connection line 15 leads away from the respective PTC heating element 13 in such a way that said connection lines protrude parallel to one another in a downwardly directed manner perpendicularly from the plane formed by the heating body 8. FIG. 2B shows a plan view of the heating body 8, and therefore the PTC heating elements 13 and the connection lines 15 are not visible. However, FIG. 2B shows that the core 10 of the heating body 8 is widened to form the receiving pockets 14 in the corresponding portions. Alternatively, the PTC heating elements 13 can of course also be attached on one side or can be arranged on a side face of the main body 8, for example on the core 10 or on one or more of the arms 11.

Figure 3:
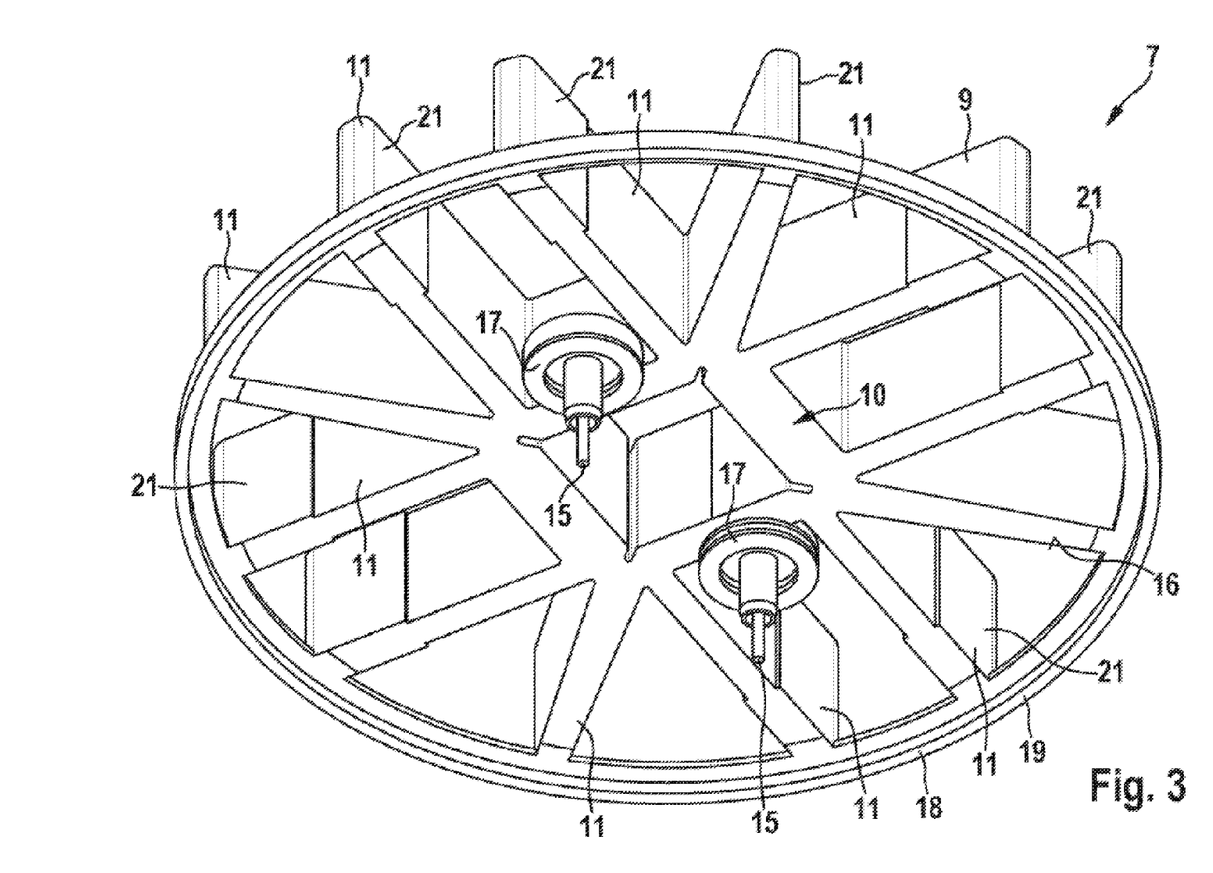
FIG. 3 shows a perspective illustration of the heating element.

Due to the subsequent extrusion coating of the main body 8 with the PTC heating elements 13 arranged thereon and/or therein, the main body 8 is provided with the plastic encapsulation 9 shown in FIG. 1. In this regard, FIG. 3 shows a perspective illustration diagonally from below of an embodiment of the heating element 7. Due to the plastic encapsulation 9, the cross-sectional tapered portions 12 of the heating body 8 are preferably covered or leveled. In addition, the connection lines 15 are each surrounded at least in regions by plastic material. Substantially coaxially with the connection lines 15, the plastic encapsulation 9 has two annularly projecting contact areas 17 at its underside 16. Furthermore, the plastic encapsulation 9 has a support ring 18, which extends over the entire outer periphery of the heating element 7, in particular in order to stabilize said heating element. The support ring 18 likewise has a contact area 19 at its underside, said contact area extending over the entire periphery of the support ring 18. Alternatively, the support ring 18 and/or the contact area 19 can be omitted.

The plastic encapsulation 9 of the heating element 7 comprises an HDPE plastic, similarly to the main body 2, and is also provided with an electrically non-conductive filler material in order to increase the thermal conductivity of the plastic encapsulation 9. The filler material can be formed by glass fibers and/or by at least one mineral filler material, in each case with high thermal conductivity and accounting for a proportion of approximately 40% by weight. Apart from the exposed ends of the connection lines 15 of the PTC heating elements 13, the heating element 7 is encased completely by the plastic encapsulation 9. The HDPE plastic and the filler materials are preferably also selected in such a way that the coefficient of thermal expansion of the plastic encapsulation 9 and of the heating body 8 are similar so that permissible elongations of the plastic are not exceeded. If the coefficients of thermal expansion of the heating body 8 and the plastic encapsulation 9 are too different, the elongations produced can be reduced by a change in shape.

During assembly, the heating element 7 is fitted onto the main body 2, as illustrated in FIG. 1, wherein the connection contacts forming free ends of the connection lines 15 are inserted into correspondingly arranged mating contact receptacles in the main body 2. The mating contact receptacles are preferably connected to connection lines, which extend through the main body 2 as far as a connection plug 20, which can be reached from the outside in the assembled state of the tank insert module. The mating contact receptacles are preferably likewise assigned annular contact faces, in particular coaxially, of which the diameters correspond to the diameter of the contact faces 17 so that, when the heating element 7 is fitted on the main body 2, the contact faces 17 bear against the mating contact faces of the main body 2. The main body 2 and the heating element 7 or the plastic encapsulation 9 thereof can thus be welded together at the contact points thus formed. Since both elements comprise the same plastic, a tight and robust connection between the heating element 7 and the main body 2 can be established in a simple manner as a result of the welding process. Alternatively, different plastics can also be used, provided these can be welded together with sufficient strength and tightness. In addition, the electrical interface 24, formed by the connection lines 15 and the corresponding mating contact receptacles of the main body 2, is tightly encased by the material of the main body 2 and of the plastic encapsulation 9. The interface 24 is preferably contacted by means of methods producing a force-locked connection. Alternatively, the electrical contacts are each provided with a corresponding meltable solder compound, which is preferably heated and softened during the welding process such that the electrical contacts are interconnected in an integrally bonded manner, whilst the main body 2 and heating element 7 are welded to one another. Heated tool welding, laser welding, infrared welding, ultrasonic welding or induction welding is preferably applied as a welding method. Due to the use of the tight, robust and long-lasting weld at the interface or contact point, the electrical contacts of the PTC heating elements 13 are led out from the tank within the weld.

If the PTC heating elements 13 are energized or activated, the heat is thus distributed over the aluminum heating body 8. The cross-sectional tapered portions 7 ensure in this instance that the heat initially propagates in the region 10 so that the liquid in the removal region, that is to say in the region assigned to the removal opening 4, is heated first particularly quickly and is thawed where necessary. Due to the cross-sectional tapered portions 12, the heating energy is distributed gradually over the heating body 8. The removal region can thus be thawed in a predefined period of time with the same amount of available heating energy. The ice is not thawed with equal energy at all contact points of the heating element 7, and therefore sustained liquid supply is ensured. It is thus also possible to prevent the ice from only being heated, without passing from the solid state into the liquid state, as may occur at low temperatures as a result of insufficient heating power. This is prevented by the different thermal radiation due to the cross-sectional tapered portion 12.

Since the main body 2 consists merely of HDPE plastic, the main body 2 acts relative to the plastic encapsulation 9 in the manner of a thermal insulation. The heat produced therefore is not wasted unnecessarily and the available energy is utilized to an optimal extent. The HDPE plastic and the filler materials are preferably selected in such a way that the plastic encapsulation 9 has a thermal conductivity of more than 0.5 W/mK.

As illustrated in FIG. 3, the arms 11 preferably have thickened regions 21 at their free ends, said thickened regions further influencing the thermal radiation of the heating element 7. The thickened regions 21 are produced by corresponding thicker plastic encapsulation 9 in these regions.

The free ends of the connection line 15 are advantageously formed as integrated male blades, which either form an electrical plug directly after the extrusion coating of the heating body 8, as illustrated, or are formed as an insulation-displacement contact or clamping contact when connected to a further component of the main body 2 in order to enable a simple and cost-effective electrical connection. The connection lines, which lead through the main body 2, are particularly preferably arranged parallel to the removal channel 3 in such a way that the waste heat of the connection lines thaws the removal channel 3 or keeps it warm. Here, the heat of the heating element 7 can either be conveyed further in the removal channel 3 by means of a corresponding material selection and/or the heat can be produced by electrical resistance in the connection line as a result of a corresponding material selection of the main body 2. Busbars or conductive lines are preferably used as a contact between the PTC elements 13 and the plug 20.

In addition, the plastic encapsulation 9 may have an interface for fastening of the filter element 6 and may form a unit with the filter, for example by welding. The heating element 7 preferably alternatively or additionally has a slosh baffle, which is preferably formed by the plastic encapsulation 9. The integration of a fill level sensor and/or ice protection elements thereof into the plastic encapsulation 9 is also conceivable. The heating element 7 is preferably arranged on the main body 2 in such a way that it is freely accessible for the liquid, at least laterally and from above, such that a large amount of liquid can be thawed or kept warm by means of convection. As can best be seen from FIG. 1, the plastic encapsulation 9 has an inclined surface or chamfer 22 at each of its edges, only some of said inclined surfaces or chamfers being provided here with reference signs. The lower edges of the heating element 7, that is to say the edges of the heating element facing the main body 2, particularly preferably each have a chamfer 22 or inclined surface. The forces acting at the heating element 7 as a result of the change to the state of matter of the liquid are thus compensated for at least in part. By providing the chamfers 22 on the underside, the weld point between the plastic encapsulation 9 and the main body 2 is relieved in particular.

A control unit or power unit can particularly preferably be integrated into the plastic encapsulation 9 or into the main body 2 by extrusion coating.

The filter element 6 is preferably formed so as to be as flat as possible and has a large filter surface. Due to the flat design, the filter element 6 can be thawed as quickly as possible in the liquid and can thus also freeze without pressure build-up in the filter interior. The large filter surface is advantageous for example so as to form the filter element 6 as a fine filter and to therefore save other filters mounted downstream, and so as to increase the service life. The large filter surface is preferably achieved by folding the filter material. Since the required filter surface and the filtration efficiency are determined for example by client requirements, system requirements, etc., a rectangular, long strip made of filter fabric is preferably first cut to size and then folded uniformly, wherein the exposed, short filter edges to be folded one on top of the other can then optionally be interconnected, for example by welding. The filter material can then be pressed flat and extrusion-coated with plastic at its inner and outer edge, preferably to form a filter support element. During the extrusion coating process, both plastic halves have to ensure a tight connection as a result of pressure on the filter fabric so that the filter fabric is not extrusion-coated. It is also conceivable to provide or to also integrally injection mold a reinforcing and/or retaining rib between the filter fabrics arranged one above the other. The retaining rib is preferably formed in one piece with the extrusion coating of the inner and outer edge. The retaining ribs, where present, preferably have a contour corresponding to the contour of the heating element 7 so that, in the event of freezing, possible compressive loads on the heating element 7 and filter element 6 are minimized/avoided.

The removal opening 4 is preferably formed directly by the main body 2 and, in the assembled state, is arranged in the region of the core 10 of the heating element 7. In order to minimize the filter height, the filter fabrics arranged one above the other are folded in one another such that they engage in one another. So that the spacing between the filter fabrics arranged one above the other and between the folds is not close to zero, a spacer is preferably provided between the filter fabrics and is manufactured in particular from plastic. For example, the spacer may consist of undulating, thin webs and, with a round filter shape, may have a spider-web-like form and may be adapted to the undulating contour of the filter. The spacer may also be welded to the plastic parts of the filter element, which hold the filter fabrics to one another. It is also conceivable to integrate the removal channel or the removal opening 3 into the spacer. The filter element 6 is preferably assigned dirt traps at the main body 2, at the heating element 7 and/or at another adjacent component, which are formed in such a way that dirt particles can only come into contact with the filter material via a detour. For example, a dirt-repelling, resilient filter disc is particularly preferably attached on the side of the element 6 pointing away from the main body 2.

Figure 4:
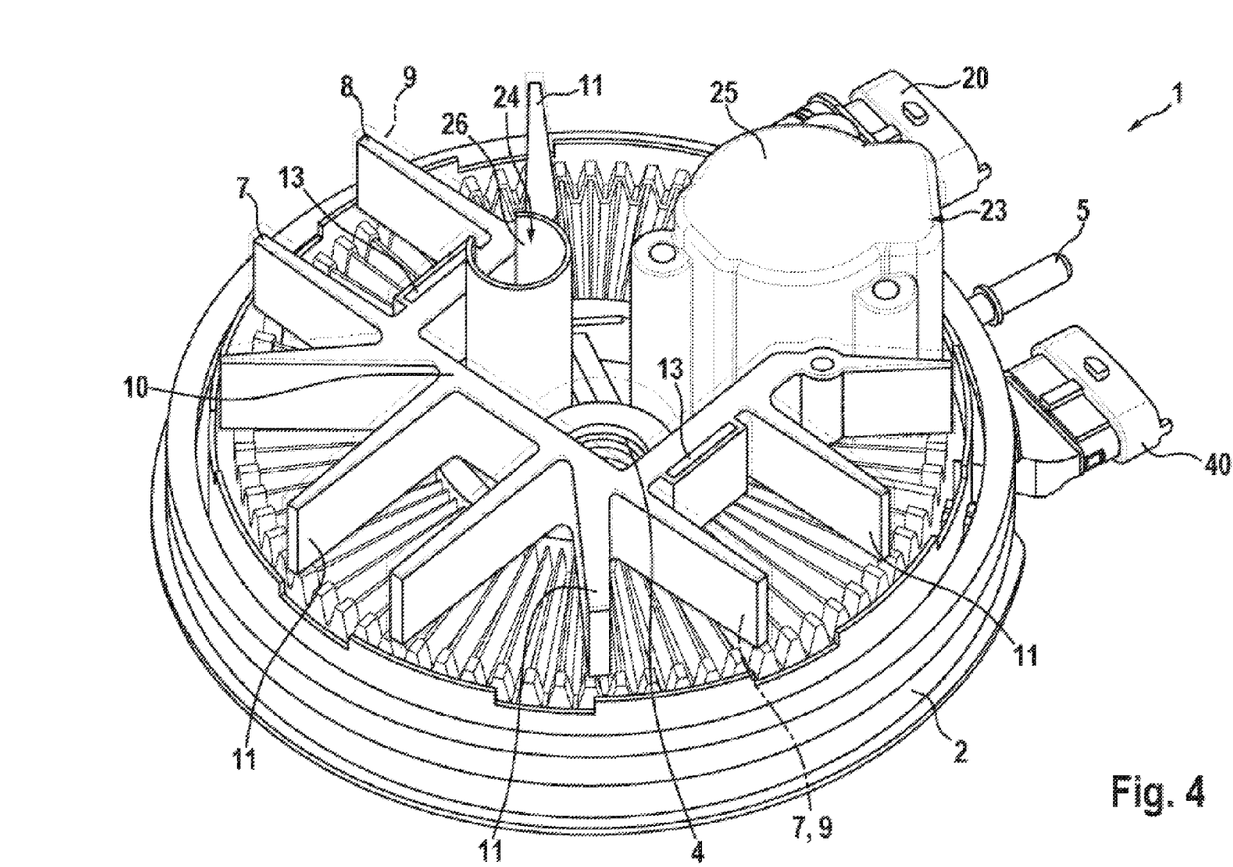
FIG. 4 shows an alternative embodiment of the tank insert module.

FIG. 4 shows a perspective illustration of a further embodiment of the tank insert module 1. Elements already known from the previous figures are provided with like reference signs and reference is therefore made in this regard to the above description. Only the differences will primarily be discussed hereinafter.

The tank insert module 1 according to FIG. 4 differs from the previous exemplary embodiment in particular since a conveying device 23 and a fill level sensor 24 with integrated temperature sensor are integrated into the main body 2. The conveying device 23 comprises a housing part 25, which is formed by the main body 2 and in which a pump for extracting the liquid from the tank is arranged or can be arranged. The conveying device 23 may additionally also contain at least one of the following components: recirculating pump, pressure sensor, heater, protective filter, electric/hydraulic plug, valves or the like.

The fill level sensor 24 is assigned a laterally slitted reflection pipe 26, of which the slit is oriented toward a portion of the heating element 7 so that liquid located in the reflection pipe 26 can be quickly thawed and a fill level below the reflection pipe 26 can also be measured. The reflection pipe 26 may alternatively also be integrated into the plastic encapsulation 9, but is preferably formed in one piece with the main body 2. The number of necessary sealing points is thus further reduced. The evaluation unit of the fill level sensor 24 is preferably cast or extrusion-coated in the main body 2. The electrical lines leading to the evaluation unit and/or to the fill level sensor 24 are preferably likewise extrusion-coated or embedded in the main body 2 and can be contacted via a further plug 40. The fill level sensor 24 is preferably designed as a contactlessly operating sensor and detects the fill level on the basis of electrical waves, sound waves and/or light waves.

Figure 7:
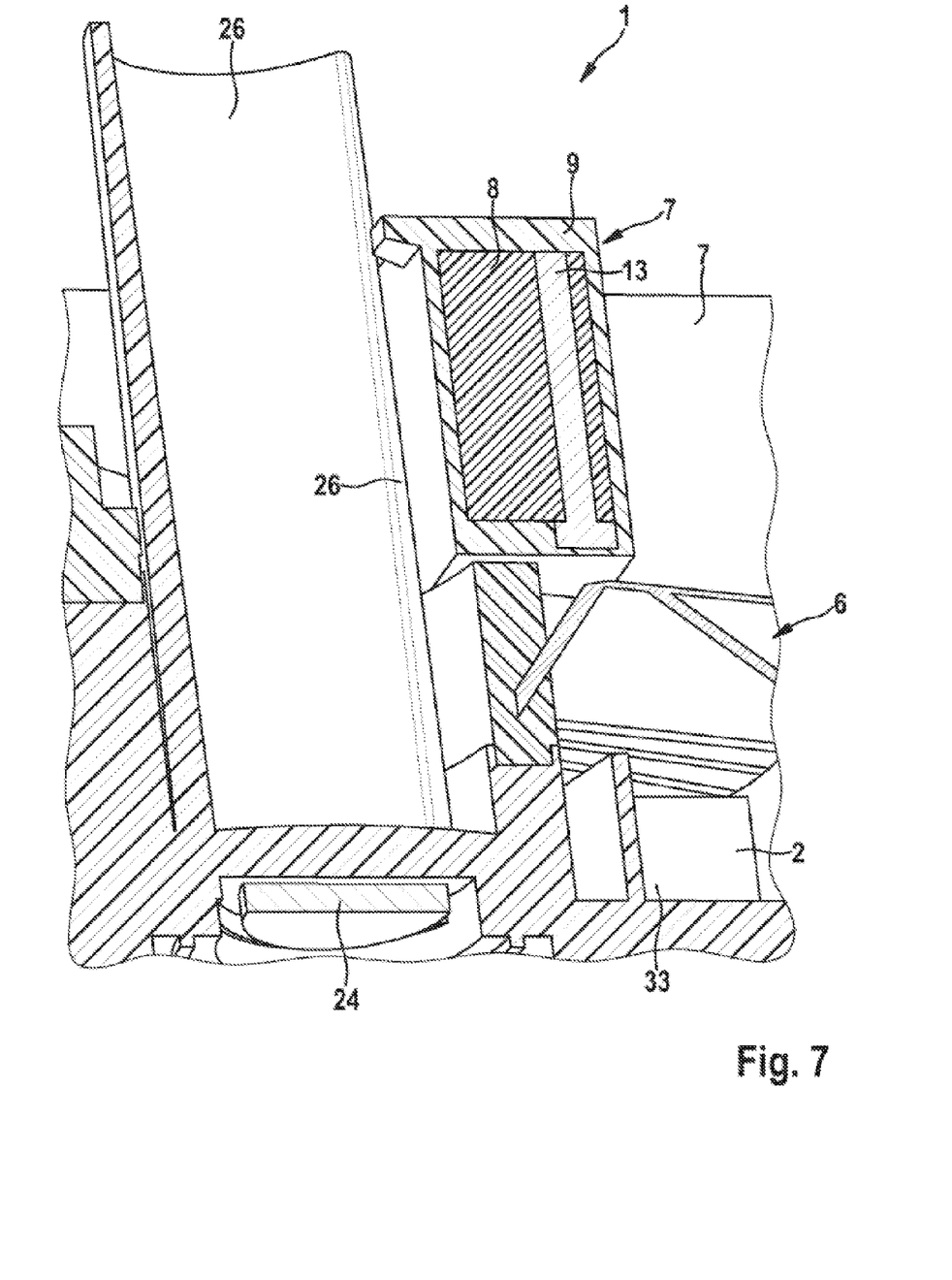
FIG. 7 shows an enlarged sectional illustration through the tank insert module according to FIG. 4.

FIG. 7 shows a cross section through the tank insert module 1 in the region of the fill level sensor 24. Here, it can be seen that the fill level sensor 24 is positioned as deep as possible in the main body 2, wherein it preferably has a round, dirt-repelling surface in order to ensure a sufficient signal quality over the service life. It is also advantageous if dirt traps 33 are attached in the immediate vicinity of the fill level sensor 24 and ensure that the dirt deposits collect there and not at the fill level sensor 24. Alternatively, the fill level sensor 24 could also be designed as a contacting fill level sensor and could project into the tank interior via a corresponding tactile element. The tactile element preferably then extends through the reflection pipe 26 in order to be protected thereby against external influences. Alternatively, the strength can be increased by reinforcement with ribs.

The fill level sensor 24 or the sensor head thereof is preferably integrated into the main body 2 by being welded in or extrusion-coated, as shown in FIG. 7. The length of the reflection pipe 26 is preferably such that the accuracy of the measurement in the lower third of the fill level region of the tank is particularly high, since the fill level has to be measured accurately at this point in particular. In order to make the signal quality independent of the changing liquid density of the liquid and/or to simultaneously detect incorrect refueling, a reference area can be integrated in the main body 2, in the filter element 6 and/or at the plastic encapsulation 9. By sending a signal to the reference area and receiving and subsequently evaluating the signal, changes in the density of the liquid can be established as a result of differences in the signal delay time. For example, incorrect refueling can thus be identified and the accuracy of the fill level measurement can be improved or corrected in accordance with the density.

Figure 5:
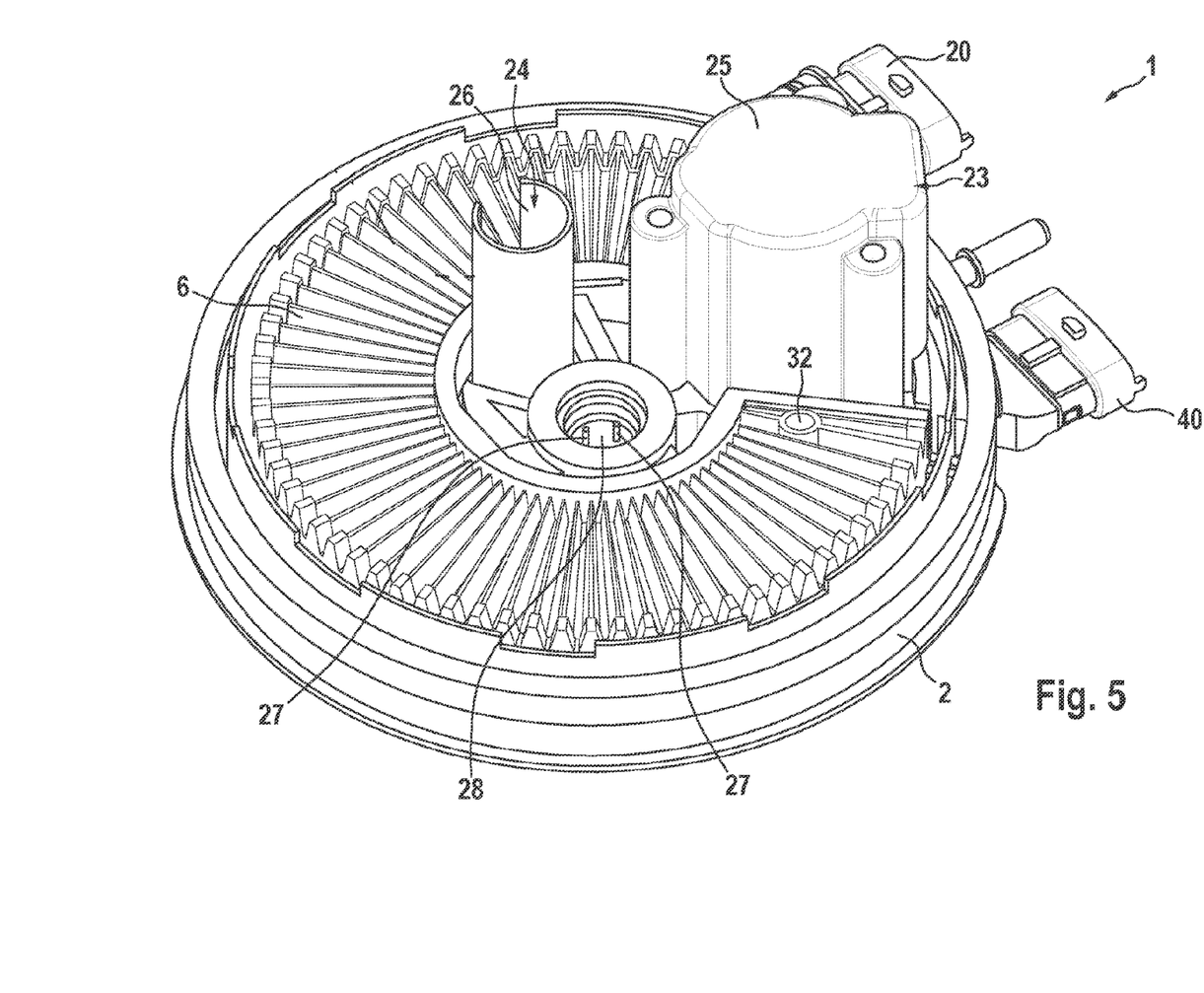
FIG. 5 shows the main body of the tank insert module from FIG. 4.
Figure 6:
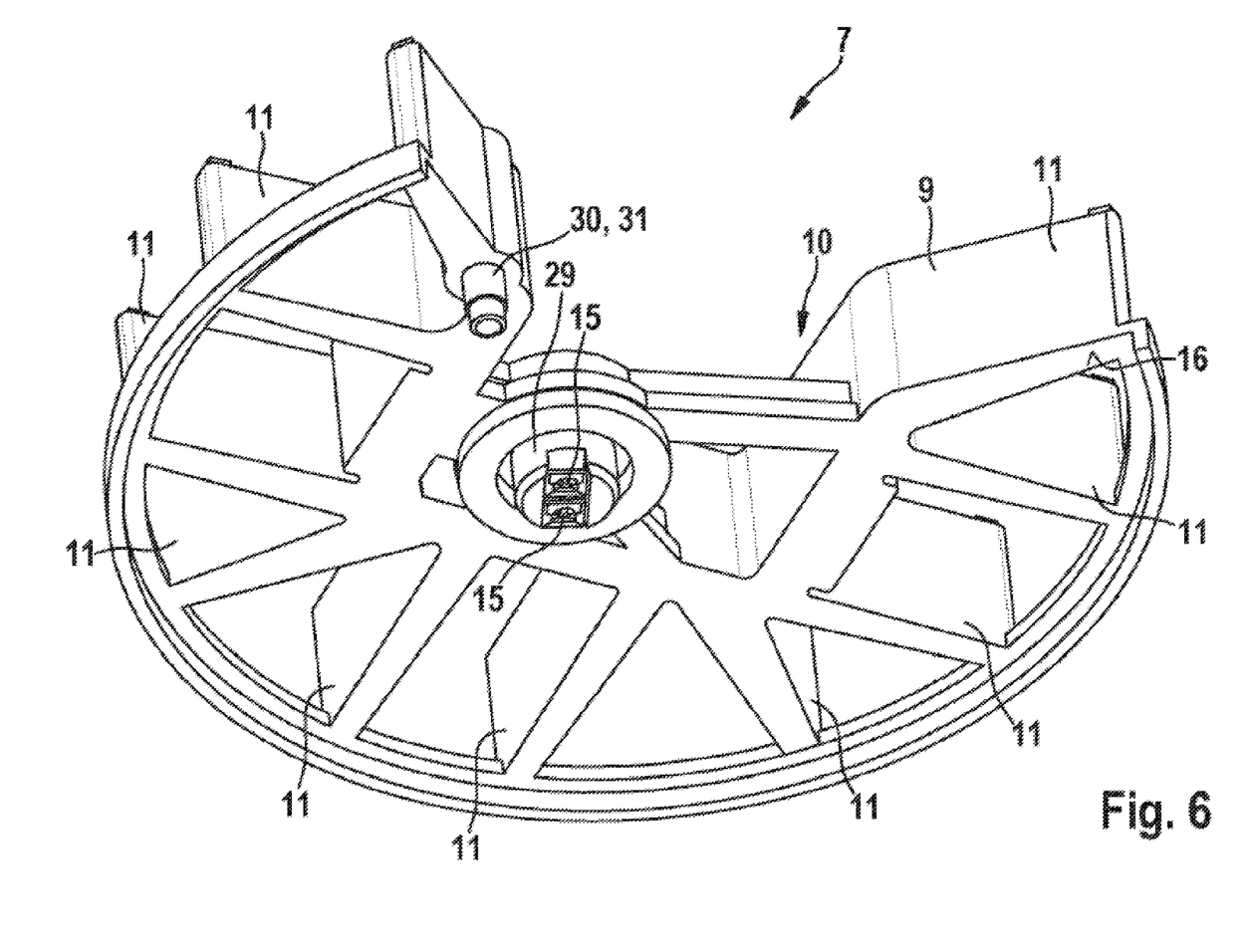
FIG. 6 shows the heating element of the tank insert module from FIG. 4.

FIG. 5 shows the tank insert module 1 according to the second embodiment without the heating element 7, which is illustrated perspectively in FIG. 6. In contrast to the previous embodiments, the free ends of the connection lines 15 for the PTC elements 13 of the heating element 7 are arranged centrally and end in receiving contacts. The main body 2, likewise centrally, has corresponding mating contacts 27, which project vertically into an indentation 28 in the main body 2. In the region of the connection lines 15, the heating element 7 or the plastic encapsulation 9 thereof has a protrusion 29, which is formed in accordance with the indentation 28 and is guided in the indentation 27 during the assembly process. The side walls of the protrusion 29 and/or of the indentation 28 are preferably formed in an inclined manner in such a way that the heating element 7 is centered at the main body 2. The mating contacts are thus also introduced automatically into the contact receptacles in the connection line 15. Due to a subsequent welding process, as already described above, a tight and robust connection is formed here between the heating element 7 and the main body 2, thus also resulting in a secure electrical interface 24 between the heating element 7 and the main body 2.

At its underside facing the main body 2, the plastic encapsulation 9 has a cylindrical protrusion 30, which is arranged on the heating element 7 in such a way that, in the assembled state, it is arranged opposite the removal opening 3. In accordance with the present embodiment, the removal opening 3 is not arranged centrally in the main body 2, but is laterally offset from the center. The protrusion 30 is used as a heat-conducting element 31, by means of which the heat from the heating element 7 is conducted closer to the removal opening 4. The filter element 6 preferably has a through-opening 32, through which the protrusion 30 can be led. In the assembled state, the protrusion 30 thus penetrates the filter element 6 so as to end particularly close to the removal opening 4. It is thus ensured that liquid, in particular located in the removal region, can be thawed quickly and efficiently.

Figure 8:
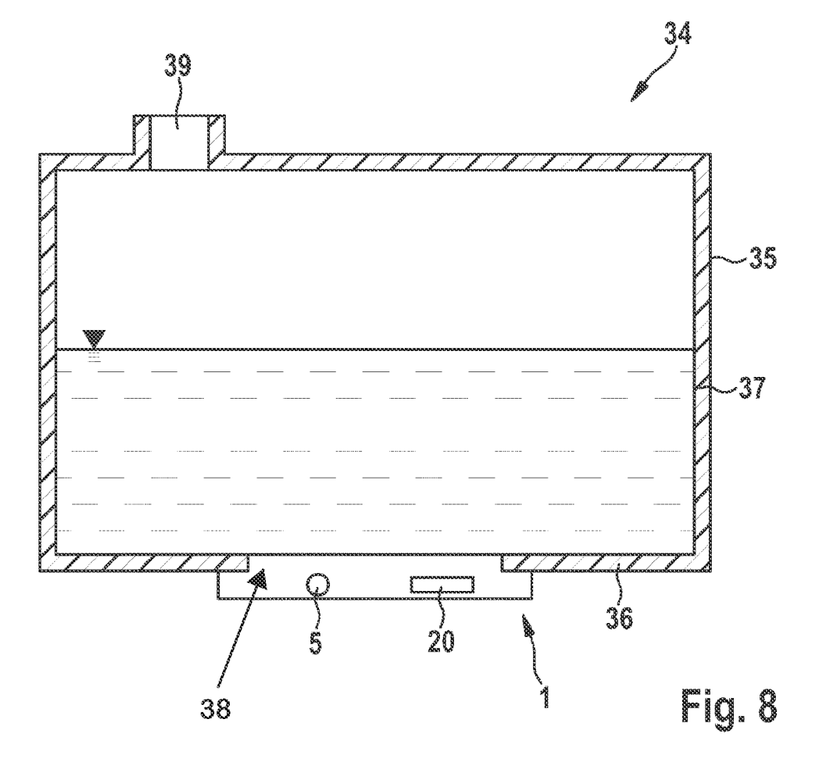
FIG. 8 shows a simplified illustration of a liquid tank with the advantageous tank insert module.

FIG. 8 shows a liquid tank 34 for a vehicle, which is designed to store exhaust gas aftertreatment agent, in particular a urea/water solution, and has a wall 35, which is preferably manufactured from plastic, more preferably from HDPE plastic. The wall forms a base 36 as well as a side wall 37 extending perpendicularly to the base along the periphery thereof. In the base 36, the wall 35 has an opening 38, into which the above-described tank insert module 1 is inserted. Contact faces, which are welded to one another during the assembly process, are provided to fixedly and tightly connect the tank insert module 1 to the liquid tank 34. Since the wall 35 and the main body 2 of the tank insert module 1 are preferably made of the same material, namely HDPE plastic, the connection can be produced in a simple manner by the welding methods already mentioned above. To fill the liquid tank 34 with the exhaust gas aftertreatment agent, the liquid tank 34 has a preferably closable filling opening 39 in its upper face, said filling opening also being assigned a vent valve where necessary. The position of installation of the tank insert module 1 in the base 36 of the liquid tank 34 ensures, at all times, uniform and reliable heating of the liquid in the tank as well as reliable liquid removal.

What is claimed is:

1. A tank insert module (1) for removing liquid from a vehicle tank, comprising a main body (2) made of a plastic material, on which a liquid removal device (23) in the form of a pump, at least one removal opening (4) arranged on the side of the main body facing a tank interior for removing liquid from the tank, and at least one electrical heating element (7) are arranged, wherein the electrical heating element (7) comprises a heating body (8) with a plastic encapsulation (9), characterized in that the plastic encapsulation (9) comprises a plastic that can be welded to the main body, and/or comprises the same plastic as the main body (2), as well as at least one filler material with a thermal conductivity greater than 0.5 W/mK and is welded to the main body (2) at least at one contact point (17), and wherein a filter element is arranged upstream of the removal opening for filtering the liquid before removal thereof.

2. The tank insert module as claimed in claim 1, characterized in that the filler material accounts for a proportion of 20% to 65%, of the weight of the plastic encapsulation (9).

3. The tank insert module as claimed in claim 1, characterized in that at least one mineral filler material and/or glass fibers is/are provided as electrically non-conductive filler material.

4. The tank insert module as claimed in claim 1, characterized in that the heating body (8) is formed at least from aluminum and has at least one positive temperature coefficient heating element (13) for heating.

5. The tank insert module as claimed in claim 1, characterized in that at least one of the welded contact points forms or has an electrical interface between the heating element (7) and a connection line (15) leading through the main body (2).

6. The tank insert module as claimed in claim 5, characterized in that the connection line (15) is assigned to a removal channel (3) of the main body (2) discharging into the removal opening (4).

7. The tank insert module as claimed in claim 1, characterized in that at least one edge of the plastic encapsulation (9) and/or of the heating body (8) has a large radius or an inclined surface or chamfer (22).

8. A liquid tank (34) for a vehicle, with at least one wall (35), which has an opening (38), in which a tank insert module (1) for removing liquid from the tank is arranged for insertion into the opening (38), wherein the tank insert module (1) is configured as claimed in claim 1.

9. The tank insert module as claimed in claim 1, characterized in that the filler material accounts for a proportion of 40% of the weight of the plastic encapsulation (9).

10. The tank insert module as claimed in claim 1, characterized in that the plastic encapsulation (9) comprises a high-density polyethylene.

11. The tank insert module as claimed in claim 1, wherein the at least one filler material has a thermal conductivity greater than 1.0 W/mK.

12. The tank insert module as claimed in claim 1, wherein the heating body extends substantially in one plane in a star-like manner with a plurality of arms having at least one cross-sectional tapered portion.

* * * * *